(12) United States Patent
Byeon

(10) Patent No.: US 11,411,471 B2
(45) Date of Patent: Aug. 9, 2022

(54) MOTOR

(71) Applicant: LG INNOTEK CO., LTD., Seoul (KR)

(72) Inventor: Dae Gil Byeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/046,480

(22) PCT Filed: Apr. 10, 2019

(86) PCT No.: PCT/KR2019/004285
§ 371 (c)(1),
(2) Date: Oct. 9, 2020

(87) PCT Pub. No.: WO2019/199056
PCT Pub. Date: Oct. 17, 2019

(65) Prior Publication Data
US 2021/0159765 A1     May 27, 2021

(30) Foreign Application Priority Data

Apr. 10, 2018    (KR) .................... 10-2018-0041653

(51) Int. Cl.
*H02K 11/215*     (2016.01)
*H02K 5/173*     (2006.01)
(Continued)

(52) U.S. Cl.
CPC ......... *H02K 11/215* (2016.01); *H02K 5/1735* (2013.01); *H02K 7/085* (2013.01); *H02K 21/22* (2013.01); *H02K 2211/03* (2013.01)

(58) Field of Classification Search
CPC .... H02K 11/215; H02K 5/1735; H02K 7/085; H02K 21/22
See application file for complete search history.

(56) References Cited

U.S. PATENT DOCUMENTS 4,818,907 A * 4/1989 Shirotori ............ G11B 19/2009
310/67 R
5,245,234 A * 9/1993 Okada ................ G02B 26/121
310/51

(Continued)

FOREIGN PATENT DOCUMENTS

CN    203596711 U    5/2014
EP    2 770 619 A2    8/2014
(Continued)

*Primary Examiner* — Dang D Le
(74) *Attorney, Agent, or Firm* — Birch, Stewart, Kolasch & Birch, LLP

(57) ABSTRACT

The present invention can provide a motor including a shaft, a yoke coupled to the shaft, a stator disposed between the shaft and the yoke, a first magnet and a second magnet which are disposed on the yoke, and a circuit board on which a first Hall sensor disposed to correspond to the first magnet and a second Hall sensor disposed to correspond to the second magnet are disposed, wherein the yoke includes a body and a flange extending from the body, the flange includes a first groove, the first magnet is disposed on an inner circumferential surface of the body, the second magnet is disposed in the first groove, and a second groove having an open portion in a direction opposite to the first groove is disposed between the body and the flange.

14 Claims, 15 Drawing Sheets

(51) Int. Cl.
*H02K 7/08* (2006.01)
*H02K 21/22* (2006.01)

(56) References Cited

U.S. PATENT DOCUMENTS

| | | | | |
|---|---|---|---|---|
| 5,254,895 A | * | 10/1993 | Koizumi | G11B 19/20 |
| | | | | 310/156.06 |
| 5,319,271 A | * | 6/1994 | Shimada | H02K 29/08 |
| | | | | 310/68 B |
| 5,408,153 A | * | 4/1995 | Imai | G11B 19/20 |
| | | | | 310/156.05 |
| 5,610,457 A | * | 3/1997 | Kurita | H02K 29/08 |
| | | | | 310/156.05 |
| 5,783,880 A | * | 7/1998 | Teshima | G11B 19/2009 |
| | | | | 310/156.13 |
| 2002/0195888 A1 | * | 12/2002 | Utsumi | H02K 21/12 |
| | | | | 310/67 R |
| 2005/0126230 A1 | | 6/2005 | Choi | |
| 2008/0218160 A1 | | 9/2008 | Tsuchida et al. | |
| 2014/0035444 A1 | | 2/2014 | Jung et al. | |
| 2016/0181888 A1 | | 6/2016 | Kodani et al. | |

FOREIGN PATENT DOCUMENTS

| | | |
|---|---|---|
| JP | 2005-169126 A | 6/2005 |
| JP | 2008-253121 A | 10/2008 |
| JP | 2015-37366 A | 2/2015 |
| JP | 2015-114209 A | 6/2015 |
| KR | 10-1787755 B1 | 10/2017 |

* cited by examiner

[FIG. 1]
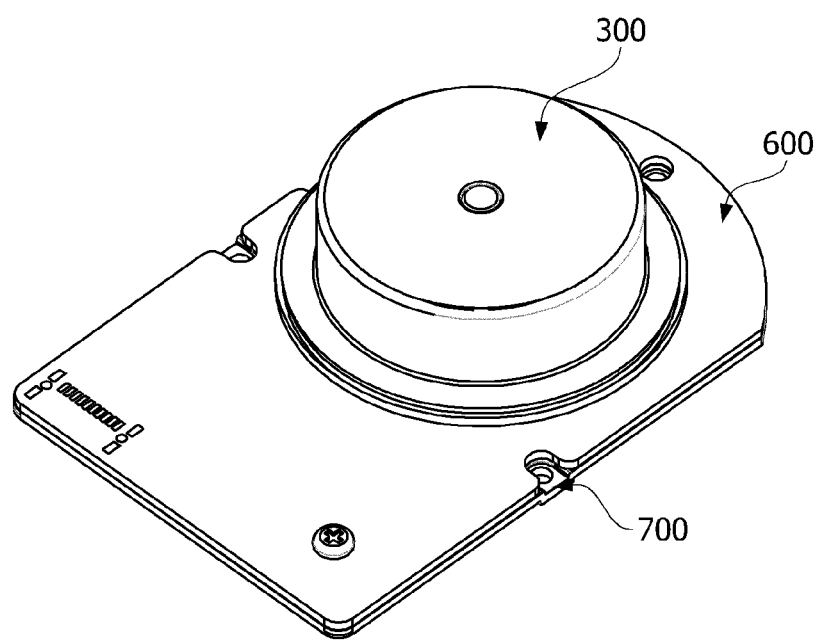

[FIG. 2]
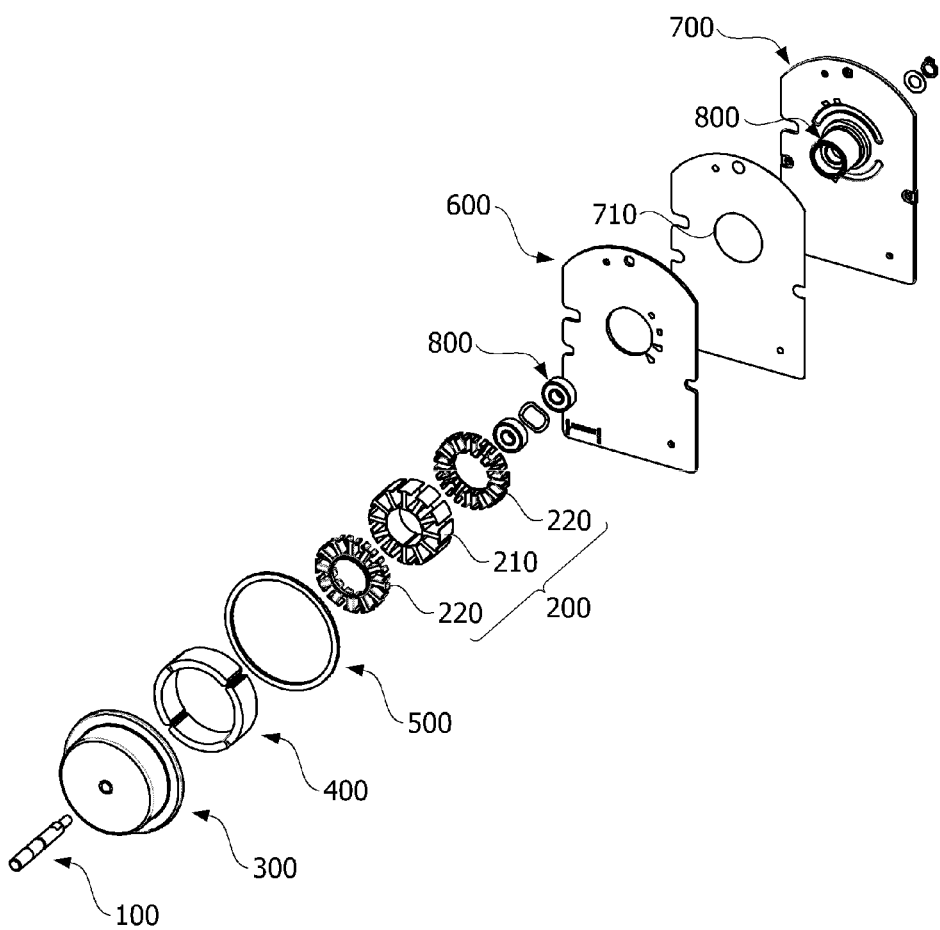

[FIG. 3]
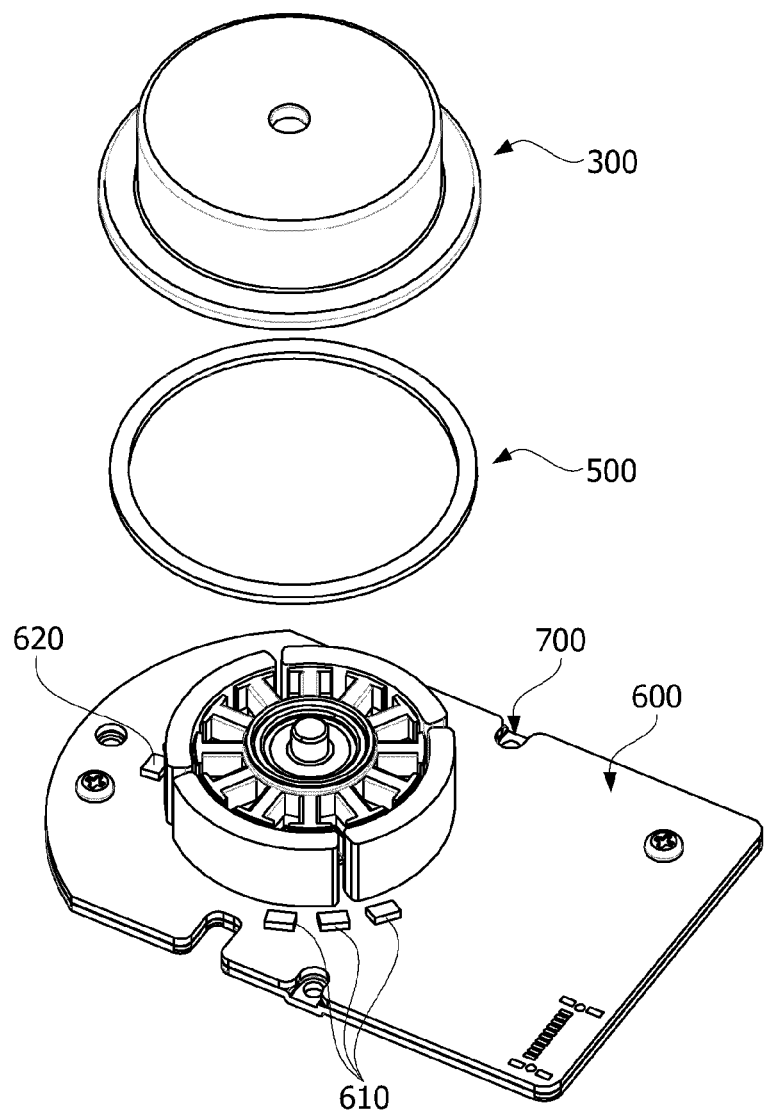

[FIG. 4]
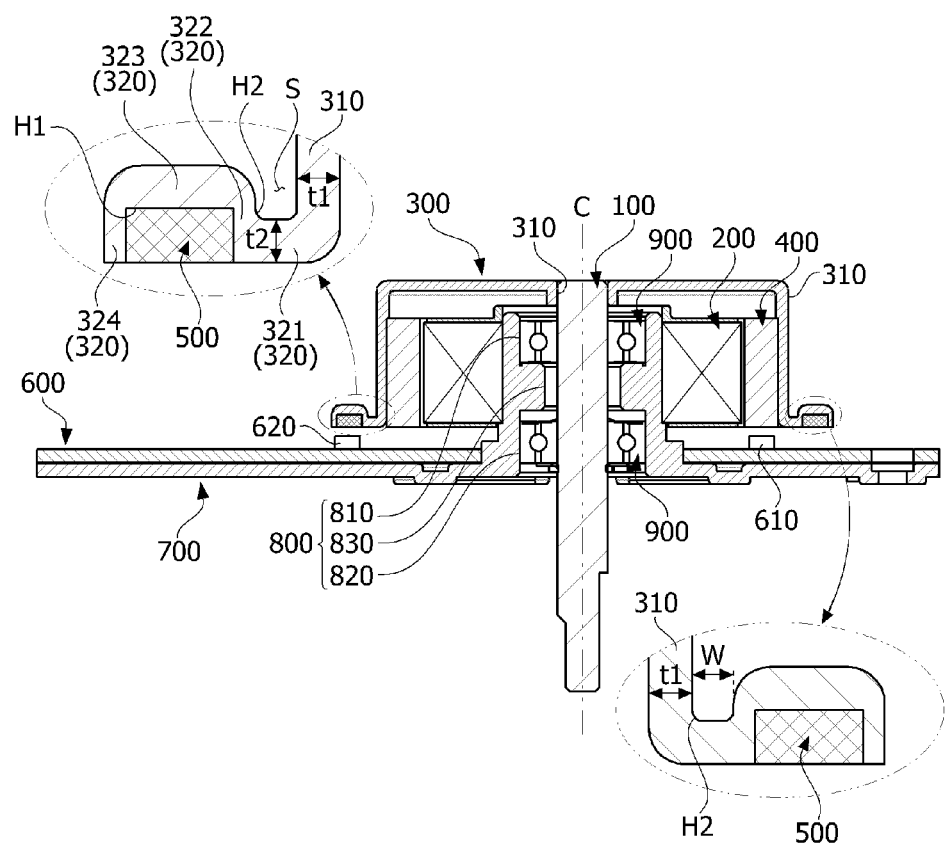

[FIG. 5]
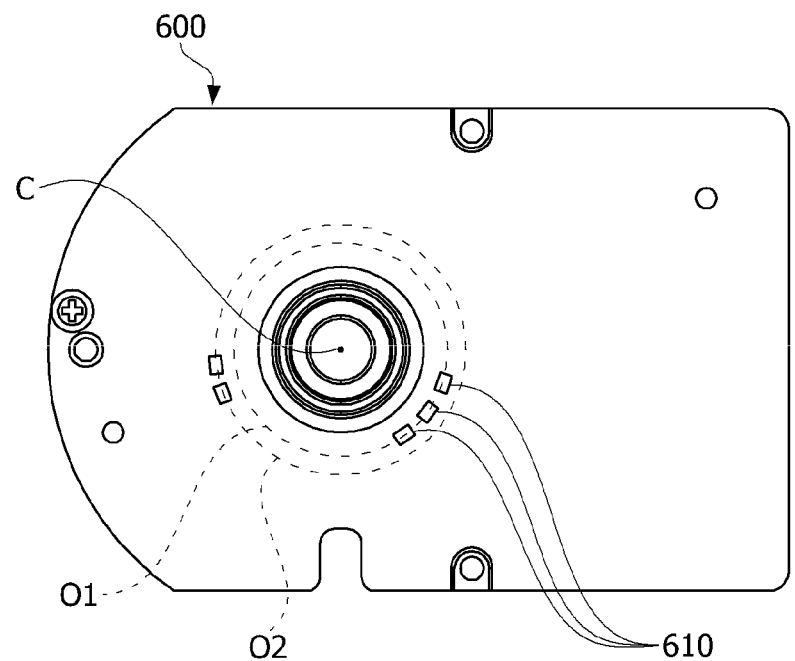

[FIG. 6]
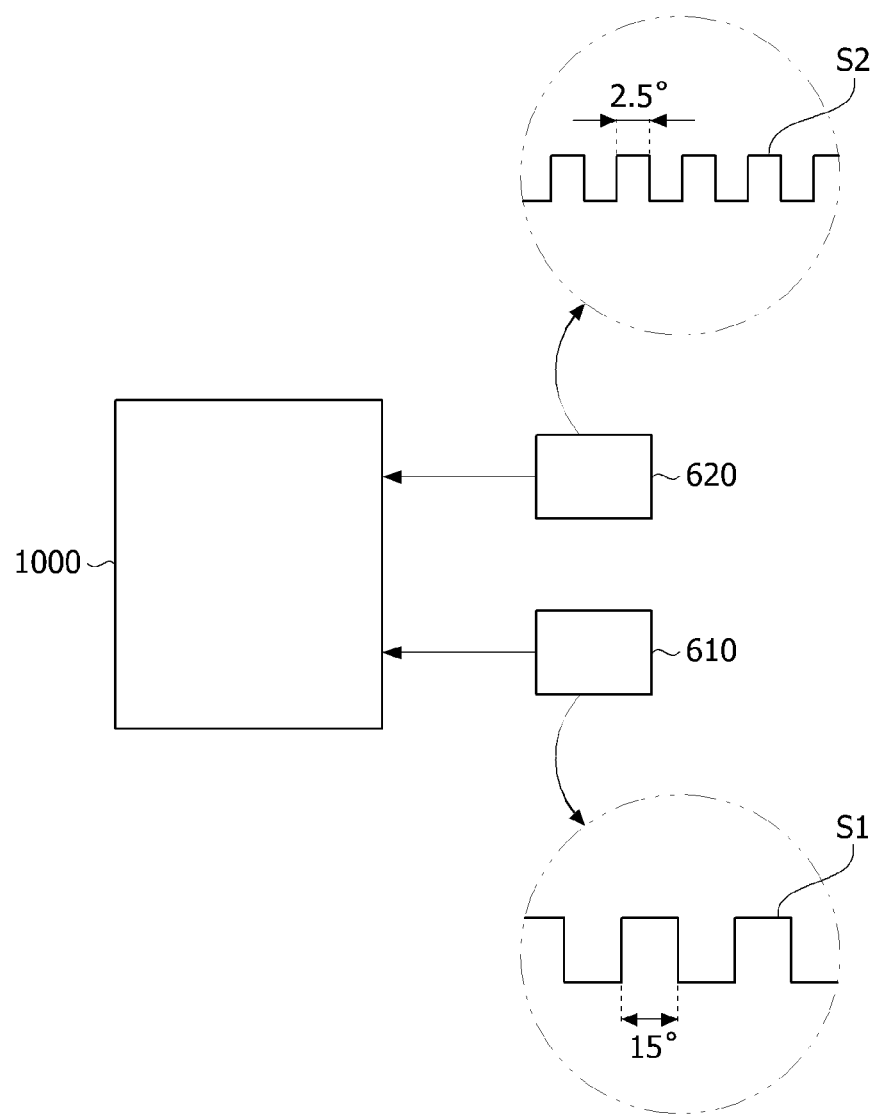

[FIG. 7]
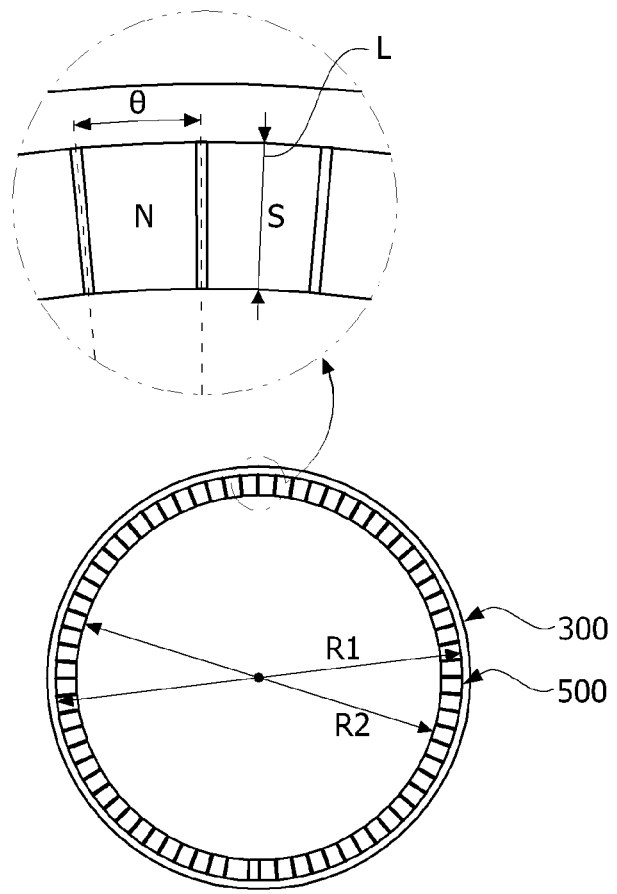

[FIG. 8]
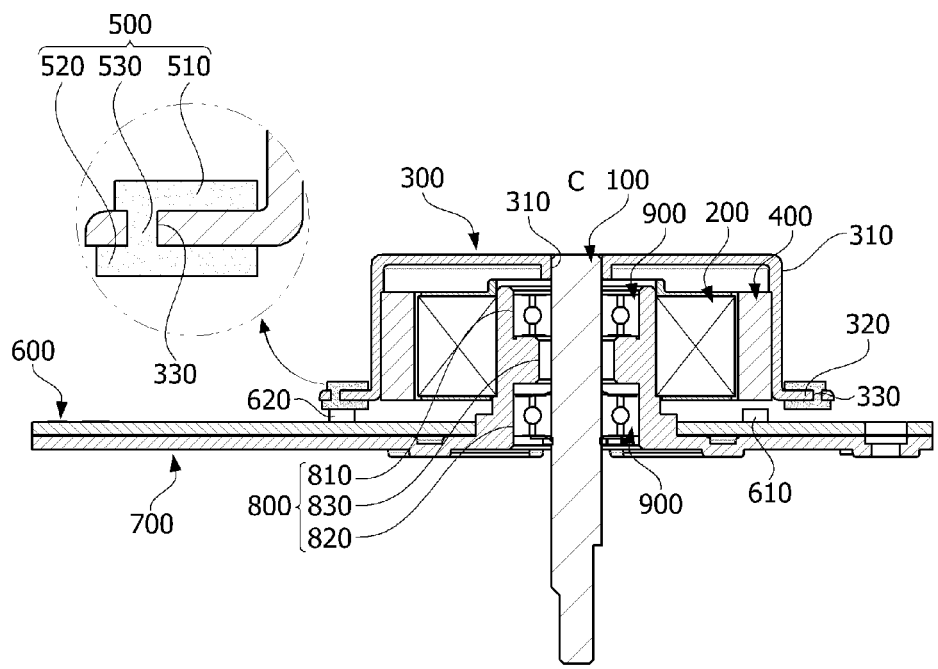

[FIG. 9]
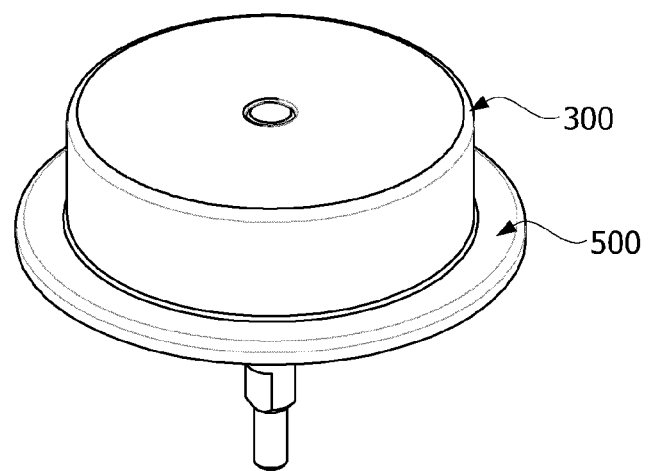

[FIG. 10]
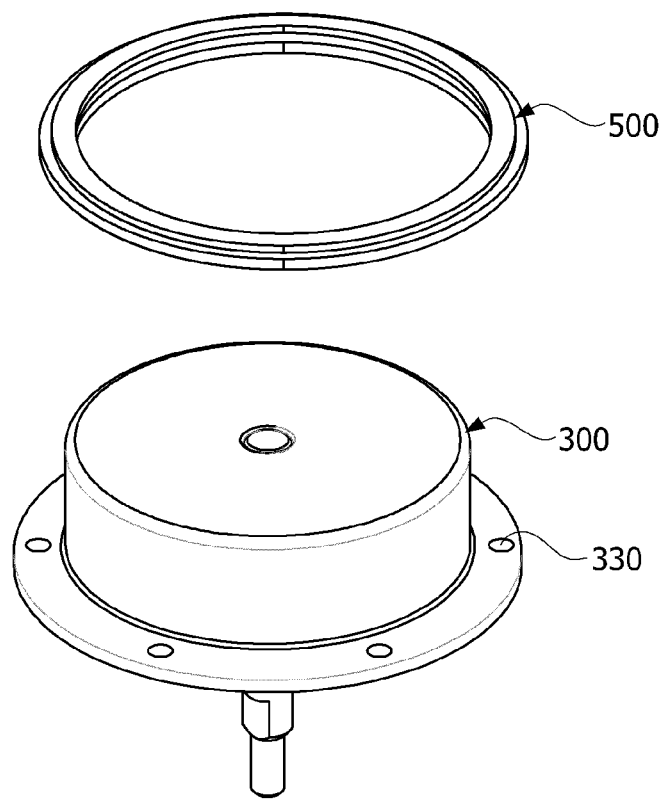

[FIG. 11]
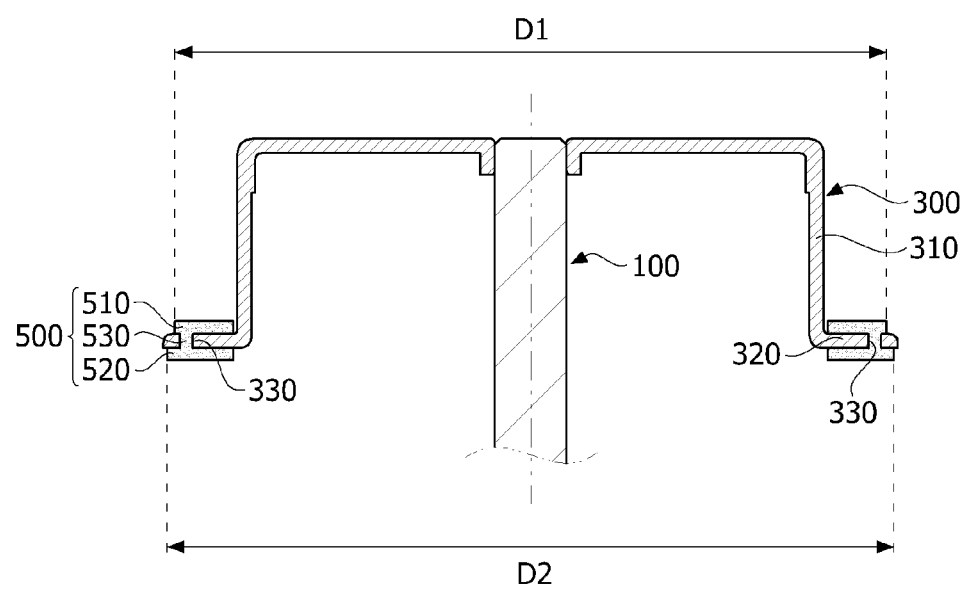

[FIG. 12]
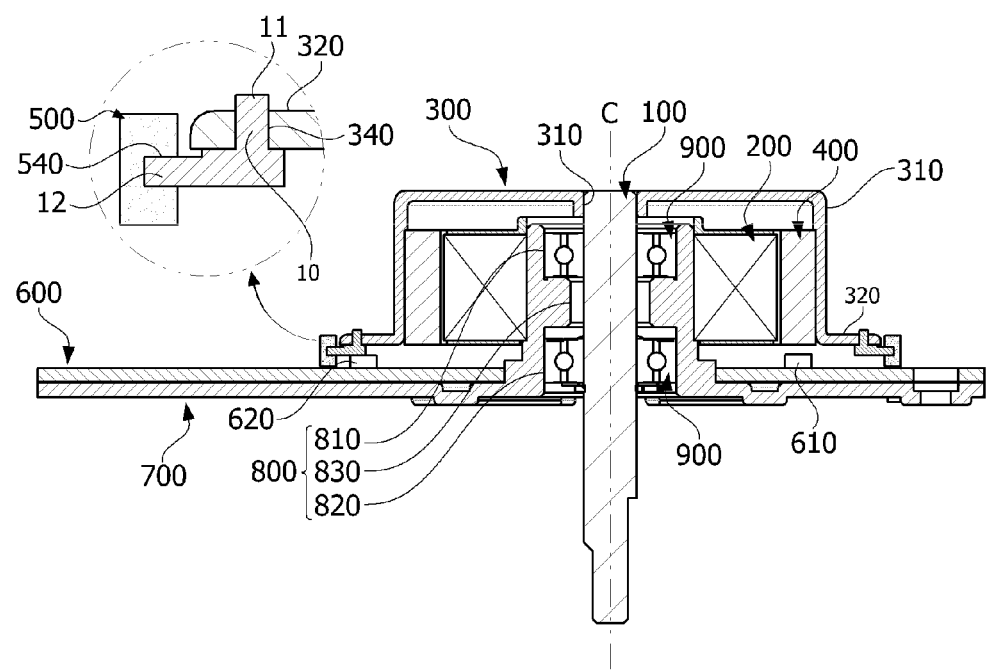

[FIG. 13]
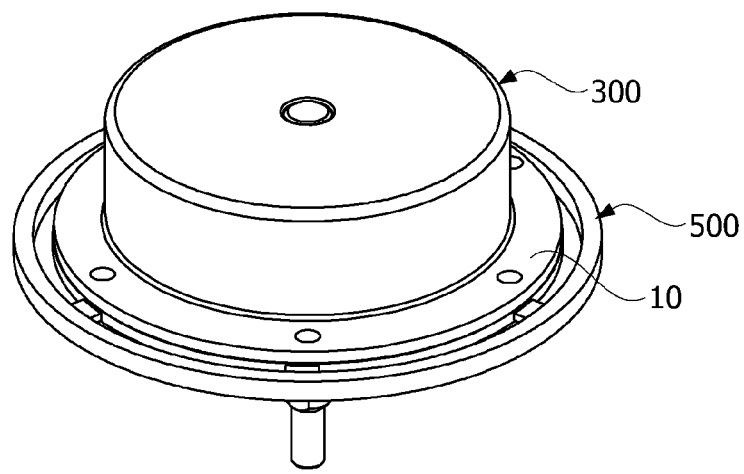

[FIG. 14]
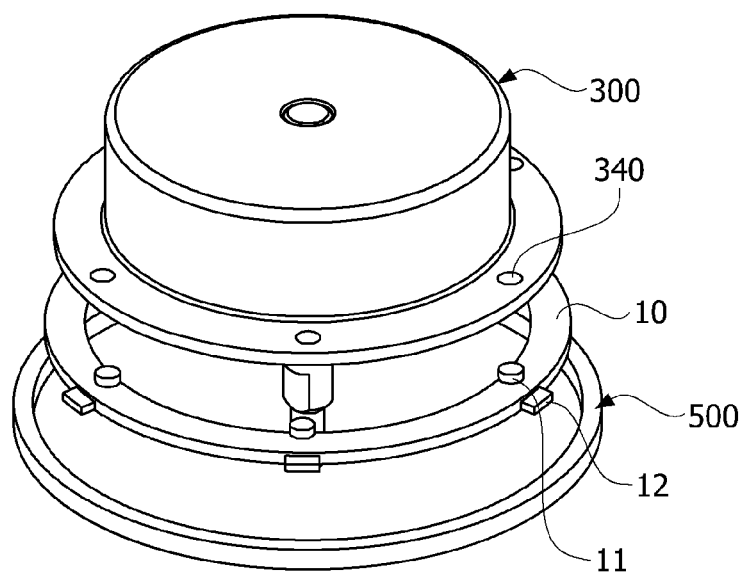

[FIG. 15]
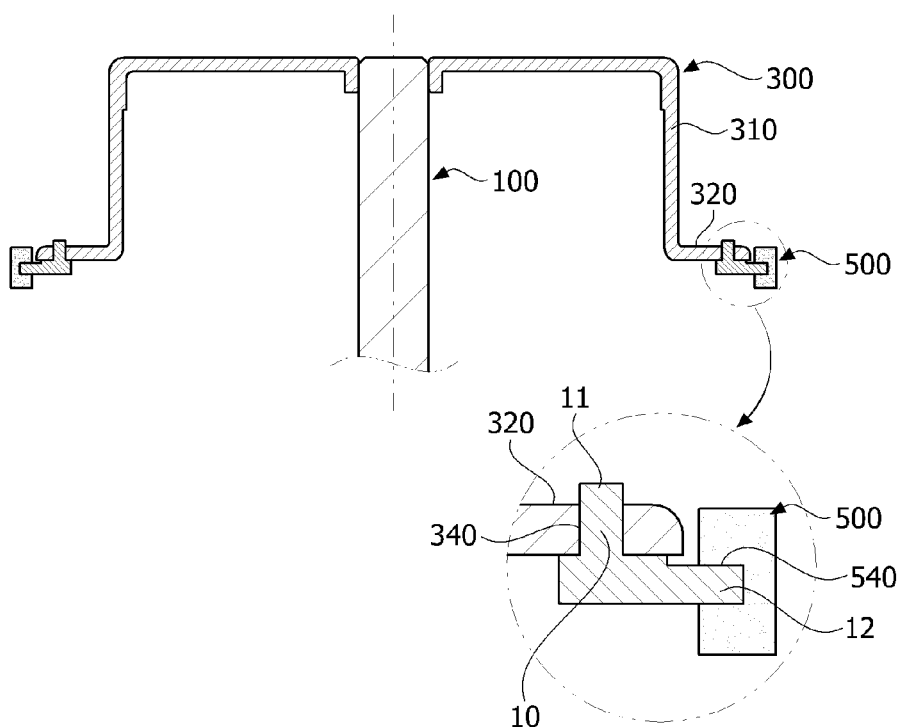

MOTOR

CROSS REFERENCE TO RELATED APPLICATIONS

This application is the National Phase of PCT International Application No. PCT/KR2019/004285, filed on Apr. 10, 2019, which claims priority under 35 U.S.C. 119(a) to Patent Application No. 10-2018-0041653, filed in the Republic of Korea on Apr. 10, 2018, all of which are hereby expressly incorporated by reference into the present application.

TECHNICAL FIELD

The present invention relates to a motor.

BACKGROUND ART

A motor may include a rotor, a stator, and a shaft. The shaft is coupled to the rotor. The rotor may be disposed outside the stator. The rotor rotates due to an electromagnetic interaction between the rotor and the stator, and when the rotor rotates, the shaft is rotated.

The motor may be used as a drive source which rotates a sensor device (for example, light detection and ranging (LiDAR)). The shaft of the motor is connected to the sensor device. In this case, constant speed driving of the motor may be an important factor to secure the performance of the sensor device. The constant speed driving of the motor may be determined by detecting a position of the rotating rotor. In order to detect the position of the rotor, the motor may include a Hall sensor configured to detect a change in magnetic flux of a drive magnet disposed on the rotor. However, in a case in which a high constant speed condition is required for the motor using the sensor device, there is a problem of a limit in satisfying the constant speed condition of the motor only by detecting the change in the magnetic flux due to the general drive magnet.

Technical Problem

The present invention is directed to providing a motor satisfying a high constant speed driving condition.

Objectives to be solved through the present invention are not limited to the above-described objective, and other objectives which are not mentioned above will be clearly understood by those skilled in the art through the following specification.

Technical Solution

One aspect of the present invention provides a motor including a shaft, a yoke coupled to the shaft, a stator disposed between the shaft and the yoke, a first magnet and a second magnet which are disposed on the yoke, and a circuit board on which a first Hall sensor disposed to correspond to the first magnet and a second Hall sensor disposed to correspond to the second magnet are disposed, wherein the yoke includes a body and a flange extending from the body, the flange includes a first groove, the first magnet is disposed on an inner circumferential surface of the body, the second magnet is disposed in the first groove, and a second groove having an open portion in a direction opposite to the first groove is disposed between the body and the flange.

The flange may include a first bent portion extending perpendicularly from the body, a second bent portion extending from the first bent portion in a direction away from the circuit board, a third bent portion extending perpendicularly from the second bent portion, and a fourth bent portion extending from the third bent portion in a direction close to the circuit board, wherein a separation space may be disposed between the body and the second bent portion.

The motor may further include a base coupled to the circuit board, a bearing housing coupled to the base, and a bearing disposed in the bearing housing, wherein the stator may be coupled to an outer side of the bearing housing, and the shaft may be rotatably supported by the bearing.

Another aspect of the present invention provides a motor including a shaft, a yoke coupled to the shaft, a stator disposed between the shaft and the yoke, a first magnet and a second magnet which are disposed on the yoke, and a circuit board on which a first Hall sensor disposed to correspond to the first magnet and a second Hall sensor disposed to correspond to the second magnet are disposed, wherein the yoke includes a body and a flange extending from the body, the flange includes a hole, and the second magnet includes an upper portion disposed on an upper surface of the flange, a lower portion disposed on a lower surface of the flange, and a connection portion disposed in the hole to connect the upper portion and the lower portion.

The hole may be provided as a plurality holes, and the plurality of holes may be disposed to be rotationally symmetrical about a center of the yoke.

An outer diameter of the upper portion may be smaller than an outer diameter of the lower portion.

Still another aspect of the present invention provides a motor including a shaft, a yoke coupled to the shaft, a stator disposed between the shaft and the yoke, a first magnet and a second magnet which are disposed on the yoke, and a circuit board on which a first Hall sensor disposed to correspond to the first magnet and a second Hall sensor disposed to correspond to the second magnet are disposed, wherein the yoke includes a body and a flange extending from the body and further includes a connection member coupled to the flange, and the second magnet is coupled to the connection member.

The flange may include a hole, the connection member includes a first protrusion and a second protrusion, the second magnet includes a third groove, the first protrusion is disposed in the hole, and the second protrusion is disposed in the third groove.

The connection member may be a member having a ring shape, the first protrusion may be disposed on an upper surface of the connection member, the second protrusion may be disposed on an outer circumferential surface of the connection member, and the third groove may be disposed in an inner circumferential surface of the second magnet.

The connection member may be disposed under the flange, and the second magnet may be disposed outside the flange.

The second magnet may include a plurality of divided magnets divided at a first angle about a center of the shaft, and the first angle may be 2.5° or less.

A width between an inner diameter and an outer diameter of the second magnet may be 7 mm or less.

The first Hall sensor may be disposed under the first magnet, the second Hall sensor may be disposed under the second magnet, and the second Hall sensor may be disposed outside the first Hall sensor with respect to a rotation center of the yoke.

The second groove may be disposed along an outer circumferential surface of the body.

A thickness of the body may be equal to a thickness of the flange.

A width of the second groove may be greater than the thickness of the body.

Advantageous Effects

According to embodiments, an advantageous effect of satisfying a high constant speed driving condition is provided.

DESCRIPTION OF DRAWINGS

FIG. 1 is a cross-sectional view illustrating a motor according to a first embodiment.

FIG. 2 is an exploded perspective view illustrating the motor illustrated in

FIG. 1.

FIG. 3 is a view illustrating a yoke illustrated in FIG. 2.

FIG. 4 is a side cross-sectional view illustrating the motor illustrated in FIG. 1.

FIG. 5 is a view illustrating a circuit board including a first Hall sensor and a second Hall sensor.

FIG. 6 is a view illustrating a controller, the first Hall sensor, and the second Hall sensor.

FIG. 7 is a view illustrating an outer diameter of the yoke and a first angle of the second magnet.

FIG. 8 is a cross-sectional view illustrating a motor according to a second embodiment.

FIG. 9 is a perspective view illustrating a yoke and a second magnet illustrated in FIG. 8.

FIG. 10 is an exploded view illustrating the yoke and the second magnet illustrated in FIG. 9.

FIG. 11 is a side cross-sectional view illustrating the yoke and the second magnet illustrated in FIG. 8.

FIG. 12 is a cross-sectional view illustrating a motor according to a third embodiment.

FIG. 13 is a perspective view illustrating a yoke and a second magnet illustrated in FIG. 12.

FIG. 14 is an exploded view illustrating the yoke and the second magnet illustrated in FIG. 12.

FIG. 15 is a side cross-sectional view illustrating the yoke and the second magnet illustrated in FIG. 12.

MODES OF THE INVENTION

Hereinafter, exemplary embodiments of the present invention will be described with reference to the accompanying drawings in detail. Purposes, specific advantages, and novel features of the invention will be made clearer from the exemplary embodiments and the following detailed description in connection with the accompanying drawings. In addition, in the description of the invention, detailed descriptions of related well-known functions which unnecessarily obscure the gist of the invention will be omitted.

Although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

FIG. 1 is a cross-sectional view illustrating a motor according to a first embodiment, FIG. 2 is an exploded perspective view illustrating the motor illustrated in FIG. 1, and FIG. 3 is a view illustrating a yoke illustrated in FIG. 2.

Referring to FIGS. 1 to 3, the motor according to the first embodiment includes a shaft 100, a stator 200, a yoke 300, a first magnet 400, a second magnet 500, a circuit board 600, a base 700, a bearing housing 800, and bearings 900.

The shaft 100 serves as an axis of rotation of the yoke 300. The shaft 100 does not rotate and is fixed to the base 700. A front end of the shaft 100 may be connected to a sensor device configured to obtain distance information.

The stator 200 is disposed outside the shaft 100. The stator 200 includes a core 210. The core 210 includes a plurality of teeth. Coils are wound around the teeth. The stator 200 may include an insulator 220. The insulator 220 is coupled to the core 210.

The yoke 300 is disposed outside the stator 200. In addition, the yoke 300 is coupled to the shaft 100. The shaft 100 is positioned at a center of the yoke 300. The shaft 100 is also rotated due to the rotation of the yoke 300.

The first magnet 400 may be disposed in the yoke 300. The first magnet 400 is for driving the yoke 300. The yoke 300 is rotated due to an electromagnetic interaction between the first magnet 400 and the stator 200 around which coils are wound. The first magnet 400 may be one annular member. Alternatively, the first magnet 400 may be a plurality of divided magnets which are combined.

The second magnet 500 may be disposed on a circumference of the yoke 300. The second magnet 500 is for detecting a position of the yoke 300 to achieve constant speed driving of the motor by detecting one rotation of the motor. The second magnet 500 may have an annular shape. The second magnet 500 may be formed with a plurality of divided magnets.

The circuit board 600 is disposed under the stator 200. The circuit board 600 may include a first Hall sensor 610 and a second Hall sensor 620. The first Hall sensor 610 detects a magnetic flux of the first magnet 400. The second Hall sensor 620 detects a magnetic flux of the second magnet 500. The first Hall sensor 610 may be disposed under the first magnet 400. In addition, the second Hall sensor 620 may be disposed under the second magnet 500. A hole 630 through which the bearing housing 800 passes is disposed in the circuit board 600.

The base 700 is disposed under the circuit board 600. The circuit board 600 may be disposed on an upper surface of the base 700. An adhesive film 710 for coupling the base 700 and the circuit board 600 may be positioned between the base 700 and the circuit board 600. A hole through which the bearing housing 800 passes is disposed in the base 700.

The bearing housing 800 includes the bearings 900 therein. The bearings 900 rotatably support the shaft 100. The bearings 900 may be disposed in upper and lower portions of the bearing housing 800.

The bearing housing 800 may include a first accommodation portion 810 and a second accommodation portion 820. The bearing 900 is disposed in the first accommodation portion 810. The bearing 900 is also disposed in the second accommodation portion 820. A partition wall 830 may be disposed between the first accommodation portion 810 and the second accommodation portion 820. The partition wall 830 protrudes in the bearing housing 800 to divide the first accommodation portion 810 from the second accommodation portion 820 and supports outer wheels of the bearings 900 in a shaft direction.

Meanwhile, the bearing housing 800 is fixed to the base 700, and the bearing housing 800 is coupled to a center of the core 210 of the stator 200.

FIG. 4 is a side cross-sectional view illustrating the motor illustrated in FIG. 1.

Referring to FIGS. 3 and 4, the yoke 300 includes a body 310 having a cylindrical shape and a flange 320. An upper side of the body 310 has a shape closed by an upper surface thereof, and a lower side of the body 310 has an open shape. The flange 320 has a shape laterally extending from a lower end of the body 310. The shaft 100 is coupled to the upper surface of the body 310, and the shaft 100 and the yoke 300 rotate together. A hole 301 is disposed at a center of the upper surface of the body 310. An end portion of the shaft 100 may be press-inserted into and coupled to the hole 301.

The magnet 400 is coupled to an inner circumferential surface of the body 310. In addition, the second magnet 500 is coupled to a lower surface of the flange 320.

Meanwhile, a thickness t1 of the body 310 may be equal to a thickness t2 of the flange 320.

FIG. 5 is a view illustrating the circuit board including the first Hall sensor and the second Hall sensor, and FIG. 6 is a view illustrating a controller, the first Hall sensor, and the second Hall sensor.

Referring to FIGS. 4 to 6, the first Hall sensor 610 is positioned under the first magnet 400. The first Hall sensor 610 may be disposed along a rotation orbit O1 of the first magnet 400 about a rotation center C of the yoke 300. Three first Hall sensors 610 may be disposed. Three first Hall sensors 610 generate three sensing signals. A controller 1000 of the motor determines a position of the yoke 300 on the basis of the sensing signals generated by the first Hall sensors 610. For example, in a case in which the first magnet 400 has eight poles and three first Hall sensors 610 are provided, an angular unit for measuring rotation is 15° based on one rotation (360°) of the yoke 300. A sensing signal 51 generated by the three first Hall sensors 610 has a pulse waveform in each rotation angle of 15°. However, in the case in which the angular unit for measuring rotation is 15°, it is difficult to precisely measure whether a speed of the motor is constant. Accordingly, whether a speed of the motor is constant is more precisely determined using the second magnet 500 and the second Hall sensor 620.

The second Hall sensor 620 is disposed under the second magnet 500. The second Hall sensor 620 may be disposed along a rotation orbit O2 of the second magnet 500 about a rotation center of the second magnet 500. The second Hall sensor 620 may be disposed outside the first Hall sensor 610 about the rotation center of the yoke 300 in a radial direction. The second Hall sensor 620 may be disposed in plurality. Since the second magnet 500 is provided as the plurality of divided magnets, the second Hall sensor 620 generates a sensing signal S2 having a pulse waveform with a period shorter than a period of a sensing signal generated by the first Hall sensor 610. The controller 1000 of the motor may detect whether a rotation speed of the motor is constant on the basis of the sensing signal generated by the second Hall sensor 620. For example, in a case in which the second magnet 500 has 72 poles and two second Hall sensors 620 are provided, an angular unit for measuring rotation is 2.5° based on one rotation (360°) of the yoke 300. Accordingly, since a sensing signal S2 generated by the two second Hall sensors 620 has a pulse waveform in each rotation angle of 2.5°, the number of rotations per minute of the motor may be checked more precisely.

Referring to FIG. 4, the yoke 300 includes the flange 320 having an annular shape. The flange 320 may include a first groove H1 and a second groove H2. The first groove H1 has an open portion in a direction opposite to an open portion of the second groove H2. The open portion of the first groove H1 faces the circuit board 600. The first groove H1 may be disposed outside the second groove H2. The second magnet 500 is disposed in the first groove H1. The second magnet 500 disposed in the first groove H1 faces the second Hall sensor 620. The first groove H1 may have an annular shape corresponding to the annular shape of the second magnet 500. The second groove H2 may be disposed along an outer circumferential surface of the body 310.

Meanwhile, a width W of the second groove H2 may be greater than the thickness t1 of the body 310. This is for effectively preventing mutual interference between a magnetic flux due to the first magnet 400 and a magnetic flux due to the second magnet 500.

Meanwhile, the flange 320 of the yoke 300 may include a first bent portion 321, a second bent portion 322, a third bent portion 323, and a fourth bent portion 324. The first bent portion 321 extends perpendicularly from the body 310. The second bent portion 322 extends from the first bent portion 321 in a direction away from the circuit board 600. The third bent portion 323 extends perpendicularly from the second bent portion 322. The fourth bent portion 324 extends from the third bent portion 323 in a direction close to the circuit board 600.

The second bent portion 322, the third bent portion 323, and the fourth bent portion 324 form the first groove H1. In addition, the first bent portion 321, the second bent portion 322, and the third bent portion 323 form the second groove H2.

A separation space S is formed between the body 310 and the second bent portion 322. The separation space S prevents mutual interference between the magnetic flux due to the first magnet 400 and the magnetic flux due to the second magnet 500 to reduce influence of the first magnet 400 on a sensing signal of the second Hall sensor 620 so that there is an advantage of precisely detecting whether a speed of the motor is constant.

FIG. 7 is a view illustrating an outer diameter of the yoke and a first angle of the second magnet.

Referring to FIG. 7, the second magnet 500 may include a plurality of divided magnets divided at a first angle Θ about a center of the shaft. In this case, the first angle Θ may be 2.5° or less. In addition, a width L between an outer diameter R1 and an inner diameter R2 of the second magnet 500 may be less than 7 mm. When the second magnet 500 is more elaborately divided, whether a speed of the motor is constant may be more correctly detected.

Meanwhile, in a motor according to a second embodiment, a second magnet 500 may be directly insertion-injected into and disposed in a flange 320.

FIG. 8 is a cross-sectional view illustrating the motor according to the second embodiment, FIG. 9 is a perspective view illustrating a yoke and the second magnet illustrated in FIG. 8, FIG. 10 is an exploded view illustrating the yoke and the second magnet illustrated in FIG. 9, and FIG. 11 is a side cross-sectional view illustrating the yoke and the second magnet illustrated in FIG. 8.

Referring to FIGS. 8 to 11, for example, the flange 320 may include holes 330, and the second magnet 500 may include an upper portion 510, a lower portion 520, and a connection portion 530. The plurality of holes 330 are provided. The holes 330 may be disposed to be rotationally symmetrical about a rotation center of a yoke 300. This is to maintain rotation balance of the yoke 300.

The upper portion 510 of the second magnet 500 is disposed on an upper surface of the flange 320. The lower portion 520 of the second magnet 500 is disposed on a lower surface of the flange 320. The connection portion 530 is disposed in the hole 330 and connects the upper portion 510 and the lower portion 520. The lower portion 520 of the second magnet 500 is disposed to face a second Hall sensor 620. In this case, an outer diameter D1 of the upper portion 510 may be smaller than an outer diameter D2 of the lower portion 520. A structure in which the flange 320 is disposed between the upper portion 510 and the lower portion 520 prevents the second magnet 500 from being separated from the yoke 300 in a shaft direction. In addition, the connection portion 530 disposed in the hole 330 of the flange 320 prevents the second magnet 500 from being separated from the yoke 300 in a rotation direction of the yoke 300.

FIG. 12 is a cross-sectional view illustrating a motor according to a third embodiment, FIG. 13 is a perspective view illustrating a yoke and a second magnet illustrated in FIG. 12, FIG. 14 is an exploded view illustrating the yoke and the second magnet illustrated in FIG. 12, and FIG. 15 is a side cross-sectional view illustrating the yoke and the second magnet illustrated in FIG. 12.

Referring to FIGS. 12 to 15, in the motor according to the third embodiment motor, a flange 320 and a second magnet 500 may be coupled using connection members 10 which are insertion-injected into the flange 320 and the second magnet 500. The flange 320 may include a plurality of holes 340. The holes 340 may be disposed to be rotationally symmetrical about a rotation center of a yoke 300. The second magnet 500 has an annular shape, and third grooves 540 are disposed in an inner circumferential surface thereof. The connection member 10 may have an annular shape. The connection member 10 may include a first protrusion 11 and a second protrusion 12. The first protrusion 11 protrudes upward from an upper surface of the connection member 10. The first protrusion 11 is disposed in the hole 340. The first protrusion 11 has a cylindrical shape. The first protrusion 11 is provided as a plurality of first protrusions to be disposed in each of the holes 340. The first protrusion 11 passes through the hole 340 and protrudes upward from an upper surface of the flange 320.

The second protrusion 12 protrudes outward from an outer circumferential surface of the connection member 10. The second protrusion 12 is disposed in the third groove 540 of the second magnet 500. The second protrusion 12 is provided as a plurality of second protrusions, and the number of the second protrusions 12 may correspond to the number of the third grooves 540 of the second magnet 500.

The second magnet 500 may be disposed outside the connection member 10. An inner diameter of the second magnet 500 may be greater than an outer diameter of the flange 320.

As described above, the motor according to one exemplary embodiment of the present invention has been specifically described with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

The invention claimed is:

1. A motor comprising:
a shaft;
a yoke coupled to the shaft;
a stator disposed between the shaft and the yoke;
a first magnet and a second magnet which are disposed on the yoke; and
a circuit board on which a first Hall sensor disposed to correspond to the first magnet and a second Hall sensor disposed to correspond to the second magnet are disposed,
wherein the yoke includes a body and a flange extending from the body,
wherein the flange includes a first groove,
wherein the first magnet is disposed on an inner circumferential surface of the body,
wherein the second magnet is disposed in the first groove,
wherein a second groove having an open portion in a direction opposite to the first groove is disposed between the body and the flange,
wherein the body and the first groove are spaced apart by the second groove,
wherein the flange includes:
a first bent portion extending perpendicularly from the body;
a second bent portion extending from the first bent portion in a direction away from the circuit board;
a third bent portion extending perpendicularly from the second bent portion; and
a fourth bent portion extending from the third bent portion in a direction close to the circuit board, and
wherein a separation space is disposed between the body and the second bent portion.

2. The motor of claim 1, further comprising:
a base coupled to the circuit board;
a bearing housing coupled to the base; and
a bearing disposed in the bearing housing,
wherein the stator is coupled to an outer side of the bearing housing, and
wherein the shaft is rotatably supported by the bearing.

3. The motor of claim 1, wherein:
the second bent portion, the third bent portion and the fourth bent portion form the first groove; and
the first bent portion, the second bent portion and the third bent portion form the second groove.

4. The motor of claim 1, wherein a width of the second groove is greater than a thickness of the body.

5. The motor of claim 1, wherein:
the first magnet is one annular member or a plurality of divided magnets which are combined, and
the second magnet is formed with a plurality of divided magnets divided at a predetermined angle about a center of the shaft.

6. A motor comprising:
a shaft;
a yoke coupled to the shaft;
a stator disposed between the shaft and the yoke;
a first magnet and a second magnet which are disposed on the yoke; and
a circuit board on which a first Hall sensor disposed to correspond to the first magnet and a second Hall sensor disposed to correspond to the second magnet are disposed,
wherein the yoke includes a body and a flange extending from the body, wherein the flange includes a hole, and wherein the second magnet includes an upper portion disposed on an upper surface of the flange, a lower portion disposed on a lower surface of the flange, and a connection portion disposed in the hole to connect the upper portion and the lower portion.

7. The motor of claim 6, wherein:

the hole is provided as a plurality of holes; and the plurality of holes are disposed to be rotationally symmetrical about a center of the yoke.

8. The motor of claim 6, wherein an outer diameter of the upper portion is smaller than an outer diameter of the lower portion.

9. The motor of claim 6, wherein:

the first magnet is disposed on an inner circumferential surface of the body; and the second magnet is coupled to the flange.

10. A motor comprising:

a shaft;

a yoke coupled to the shaft;

a stator disposed between the shaft and the yoke;

a first magnet and a second magnet which are disposed on the yoke; and a circuit board on which a first Hall sensor disposed to correspond to the first magnet and a second Hall sensor disposed to correspond to the second magnet are disposed, wherein the yoke includes a body and a flange extending from the body and further includes a connection member coupled to the flange, wherein the second magnet is coupled to the connection member, wherein an inner diameter of the second magnet is greater than an outer diameter of the flange, wherein the second magnet is disposed outside the connection member, and wherein the connection member is coupled to the second magnet to connect the flange and the second magnet.

11. The motor of claim 10, wherein:

the flange includes a hole;

the connection member includes a first protrusion and a second protrusion;

the second magnet includes a third groove;

the first protrusion is disposed in the hole; and the second protrusion is disposed in the third groove.

12. The motor of claim 11, wherein:

the connection member is a member having a ring shape;

the first protrusion is disposed on an upper surface of the connection member;

the second protrusion is disposed on an outer circumferential surface of the connection member; and the third groove is disposed in an inner circumferential surface of the second magnet.

13. The motor of claim 11, wherein:

the hole is provided as a plurality of holes; and the plurality of holes are disposed to be rotationally symmetrical about a center of the yoke.

14. The motor of claim 10, wherein the connection member is disposed under the flange.

* * * * *